(12) United States Patent
Yamada et al.

(10) Patent No.: US 10,706,585 B2
(45) Date of Patent: Jul. 7, 2020

(54) EYEBALL INFORMATION ESTIMATION DEVICE, EYEBALL INFORMATION ESTIMATION METHOD, AND EYEBALL INFORMATION ESTIMATION PROGRAM

(71) Applicant: AISIN SEIKI KABUSHIKI KAISHA, Kariya-shi, Aichi-ken (JP)

(72) Inventors: Yuya Yamada, Kariya (JP); Takashi Kato, Kariya (JP); Hironobu Hoda, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 16/580,511

(22) Filed: Sep. 24, 2019

(65) Prior Publication Data
US 2020/0105016 A1    Apr. 2, 2020

(30) Foreign Application Priority Data
Sep. 27, 2018  (JP) .................................. 2018-182507

(51) Int. Cl.
G06T 7/70       (2017.01)
G06T 7/73       (2017.01)
G06K 9/00       (2006.01)

(52) U.S. Cl.
CPC ............ G06T 7/75 (2017.01); G06K 9/00604 (2013.01); *G06T 2207/30201* (2013.01)

(58) Field of Classification Search
CPC ............ G06T 7/75; G06T 2207/30201; G06K 9/00604

USPC ........................................................ 382/103
See application file for complete search history.

(56) References Cited

U.S. PATENT DOCUMENTS

| 10,108,261 | B1* | 10/2018 | Hall ........................ G06F 3/013 |
| 2005/0195277 | A1* | 9/2005 | Yamasaki ............ G02B 27/017 348/61 |
| 2010/0013949 | A1* | 1/2010 | Miyamoto ............. A61B 3/113 348/222.1 |
| 2019/0076015 | A1* | 3/2019 | Johansson ................ A61B 3/11 |
| 2019/0108383 | A1* | 4/2019 | Klingstrom .......... G06K 9/0061 |

FOREIGN PATENT DOCUMENTS

JP          2013-252301 A     12/2013

* cited by examiner

*Primary Examiner* — Michael R Neff
(74) *Attorney, Agent, or Firm* — Sughrue Mion, PLLC

(57) ABSTRACT

An eyeball information estimation device includes: an acquisition unit acquiring an image including a pupil of a subject and a Purkinje image of the subject; a detection unit detecting a center position of the pupil and a position of the Purkinje image; a selection unit selecting which of first and second sight line angle calculation processings of calculating a sight line angle of the eye of the subject is to be executed; and a processing unit estimating an eyeball center position of the subject based on a three-dimensional face model and updating an eyeball center position of a storage unit, at least on a condition that a pupil reliability is higher than a first pupil threshold value, and a Purkinje reliability is higher than a first Purkinje threshold value, when the first sight line angle calculation processing is selected.

6 Claims, 10 Drawing Sheets

T  36

T  36

EYEBALL INFORMATION ESTIMATION DEVICE, EYEBALL INFORMATION ESTIMATION METHOD, AND EYEBALL INFORMATION ESTIMATION PROGRAM

CROSS REFERENCE TO RELATED APPLICATIONS

This application is based on and claims priority under 35 U.S.C. § 119 to Japanese Patent Application 2018-182507, filed on Sep. 27, 2018, the entire contents of which are incorporated herein by reference.

TECHNICAL FIELD

This disclosure relates to an eyeball information estimation device, an eyeball information estimation method, and an eyeball information estimation program.

BACKGROUND DISCUSSION

JP 2013-252301A (Reference 1) discloses a technique has been proposed for estimating a three-dimensional position of an eye (eyeball) of a face included in a captured image (still image or moving image). An estimated eyeball center position can be used, for example, for calculation of a sight line angle (sight line direction). Since the eyeball center position differs depending on the skeleton or contour of each subject, in order to estimate the eyeball center position with higher accuracy, the prior calibration was necessary and the processing was complicated. Here, an estimation device has been proposed which estimates the three-dimensional position of the eyeball center without performing calibration with high accuracy. The estimation device calculates three-dimensional sight line vectors oriented to the three-dimensional position of the pupil center from the preset statistical three-dimensional position of the eyeball center for each of the left and right eyes, based on the estimated three-dimensional position posture of the face and the detected two-dimensional position of the pupil center on a face image. In addition, based on the time series of the three-dimensional sight line vectors of each of the left and right eyes, for example, optimum values of the three-dimensional positions of the eyeball centers of each of the left and right eyes in a face model coordinate system are estimated such that the errors of the three-dimensional positions of visual targets, such as each of the left and right eyes, are minimized.

However, for example, in a situation where the sight line angle (sight line direction) is used, there is a low possibility that a subject who estimates the eyeball center position stays still for a long time, and there is a case where a face direction irregularly changes. Therefore, there is a case where detection of the two-dimensional position of the pupil center, the coordinate system of the three-dimensional face model, and the like becomes unstable. In such a case, when the position of the eyeball center is estimated as it is, an error occurring in the two-dimensional position of the pupil center or the coordinate system of the three-dimensional face model is reflected in the estimated three-dimensional position of the eyeball position as it is, and there is a problem that the accuracy deteriorates. As a result, there are cases where the sight line angle (sight line direction) cannot be calculated correctly. Therefore, it is meaningful that an eyeball information estimation device, an eyeball information estimation method, and an eyeball information estimation program capable of suppressing deterioration of estimation accuracy of the eyeball center position can be provided since high accuracy in various types of processing using the eyeball center position, for example, calculation of the sight line angle, is achieved.

SUMMARY

An eyeball information estimation device according to an aspect of this disclosure includes, for example, an acquisition unit configured to acquire an image that includes a pupil of an eye of a subject and a Purkinje image of a light source on a corneal surface of the eye of the subject; a detection unit configured to detect a center position of the pupil and a position of the Purkinje image; a selection unit configured to select which of first sight line angle calculation processing of calculating a sight line angle of the eye of the subject based on the center position of the pupil and the position of the Purkinje image, and second sight line angle calculation processing of calculating the sight line angle of the eye of the subject based on the center position of the pupil and an eyeball center position of the eye that is read from a storage unit and corresponds to the subject is to be executed; and a processing unit configured to estimate an eyeball center position of the eye of the subject based on a three-dimensional face model determined based on the sight line angle and update the eyeball center position of the storage unit, at least on a condition that a pupil reliability indicating a likelihood of being the pupil is higher than a predetermined first pupil threshold value, and a Purkinje reliability indicating a likelihood of being the Purkinje image is higher than a predetermined first Purkinje threshold value, in a case where the first sight line angle calculation processing is selected. According to this configuration, for example, in a case where the pupil reliability and the Purkinje reliability are high (in a case where each has a predetermined reliability), the eyeball center position is estimated using the sight line angle calculated based on the pupil center position and the position of the Purkinje image having a reliability. As a result, it is possible to avoid that the eyeball center position is estimated by a value having a low reliability. Therefore, it is possible to suppress deterioration of the sight line angle calculation accuracy using the eyeball center position in the subsequent processing, and to contribute to the maintenance or improvement of the calculation accuracy of the sight line calculation angle as a whole.

An eyeball information estimation method according to another aspect of this disclosure includes, for example, an acquiring step of acquiring an image that includes a pupil of an eye of a subject and a Purkinje image of a light source on a corneal surface of the eye of the subject; a detecting step of detecting a center position of the pupil and a position of the Purkinje image; a selecting step of selecting which of first sight line angle calculation processing of calculating a sight line angle of the eye of the subject based on the center position of the pupil and the position of the Purkinje image, and second sight line angle calculation processing of calculating the sight line angle of the eye of the subject based on the center position of the pupil and an eyeball center position of the eye that is read from a storage unit and corresponds to the subject is to be executed; and a processing step of estimating an eyeball center position of the eye of the subject based on a three-dimensional face model determined based on the sight line angle and updating the eyeball center position of the storage unit, at least on a condition that a pupil reliability indicating a likelihood of being the pupil is higher than a predetermined first pupil threshold value, and a Purkinje reliability indicating a likelihood of being the Purkinje image is higher than a predetermined first Purkinje threshold value, in a case where the first sight line angle calculation processing is selected. According to this configuration, for example, in a case where the pupil reliability and the Purkinje reliability are high (in a case where each has a predetermined reliability), the eyeball center position is estimated using the sight line angle calculated based on the pupil center position and the position of the Purkinje image having a reliability. As a result, it is possible to avoid that the eyeball center position is estimated by a value having a low reliability. Therefore, it is possible to suppress deterioration of the sight line angle calculation accuracy using the eyeball center position in the subsequent processing, and to contribute to the maintenance or improvement of the calculation accuracy of the sight line calculation angle as a whole.

An eyeball information estimation program according to still another aspect of this disclosure causes a computer to execute, for example, an acquiring step of acquiring an image that includes a pupil of an eye of a subject and a Purkinje image of a light source on a corneal surface of the eye of the subject, a detecting step of detecting a center position of the pupil and a position of the Purkinje image, a selecting step of selecting which of first sight line angle calculation processing of calculating a sight line angle of the eye of the subject based on the center position of the pupil and the position of the Purkinje image, and second sight line angle calculation processing of calculating the sight line angle of the eye of the subject based on the center position of the pupil and an eyeball center position of the eye that is read from a storage unit and corresponds to the subject is to be executed, and a processing step of estimating an eyeball center position of the eye of the subject based on a three-dimensional face model determined based on the sight line angle and updating the eyeball center position of the storage unit, at least on a condition that a pupil reliability indicating a likelihood of being the pupil is higher than a predetermined first pupil threshold value, and a Purkinje reliability indicating a likelihood of being the Purkinje image is higher than a predetermined first Purkinje threshold value, in a case where the first sight line angle calculation processing is selected. According to this configuration, for example, in a case where the pupil reliability and the Purkinje reliability are high (in a case where each has a predetermined reliability), it is possible to cause a computer to execute the processing of estimating the eyeball center position using the sight line angle calculated based on the pupil center position and the position of the Purkinje image having a reliability. As a result, it is possible to avoid that the eyeball center position is estimated by a value having a low reliability. Therefore, it is possible to suppress deterioration of the sight line angle calculation accuracy using the eyeball center position in the subsequent processing, and to contribute to the maintenance or improvement of the calculation accuracy of the sight line calculation angle as a whole.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exemplary perspective view illustrating a state where a part of a vehicle interior of a vehicle capable of mounting an eyeball information estimation device according to the embodiment is seen through;

DETAILED DESCRIPTION

Hereinafter, an exemplary embodiment disclosure here will be disclosed. The configurations of the embodiments illustrated below, and the operations, results, and effects provided by the configurations are examples. The disclosure can be realized by configurations other than the configurations disclosed in the following embodiment, and at least one of various effects based on the basic configuration and derivative effects can be obtained.

In the embodiment described below, a case where an eyeball information estimation device is mounted on a vehicle and estimation and update of eyeball information, specifically, an eyeball center position, are performed while an occupant (for example, a driver) is a subject, will be described.

Figure 1:
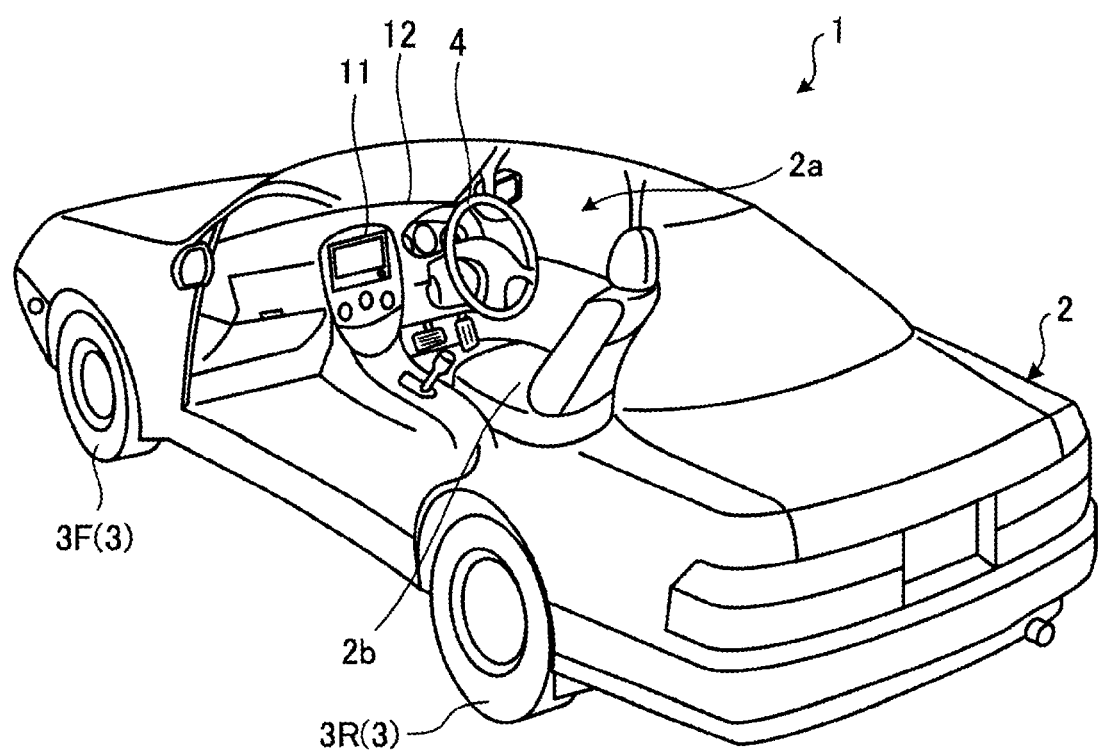

A vehicle 1 illustrated in FIG. 1 may be, for example, an automobile (internal combustion engine automobile) having an internal combustion engine (engine, not illustrated) as a driving source, an automobile (electric car, fuel battery car, and the like) having an electric motor (motor, not illustrated) as a driving source, or an automobile (hybrid car) having both the internal combustion engine and the electric motor as a driving source. In addition, the vehicle 1 can mount various transmission devices, and can mount various devices (systems, components, and the like) necessary to drive the internal combustion engine or the electric motor. Further, the method, number, layout, and the like of devices related to driving of wheels 3 in the vehicle 1 can be set variously.

As illustrated in FIG. 1, a vehicle body 2 of the vehicle 1 configures a vehicle interior 2a in which a driver (not illustrated) is onboard. A steering unit 4 and the like are provided in the vehicle interior 2a in a state of facing a seat 2b of the driver as an occupant. In the embodiment, as an example, the steering unit 4 is a steering wheel that protrudes from a dashboard 12 (instrument panel).

Further, as illustrated in FIG. 1, in the embodiment, as an example, the vehicle 1 is a four-wheeled vehicle (four-wheeled automobile), and has two left and right front wheels 3F and two left and right rear vehicle wheels 3R. Furthermore, in the embodiment, any of the four wheels 3 is configured to be steerable.

In addition, a monitor device 11 is provided at a center portion in a vehicle width direction, that is, a left-right direction of the dashboard 12 in the vehicle interior 2a. The monitor device 11 is provided with a display device or a voice output device. The display device is, for example, a liquid crystal display (LCD), an organic electroluminescent display (OELD), or the like. The voice output device is, for example, a speaker. In addition, the display device is covered with a transparent operation input unit, such as a touch panel. The occupant can visually recognize the image displayed on a display screen of the display device through the operation input unit. In addition, the occupant can execute the operation input by operating the operation input unit with a finger or the like by touching, pressing, or moving the operation input unit at a position that corresponds to an image displayed on the display screen of the display device. The monitor device 11 can be used, for example, as a navigation system or an audio system.

Figure 2:
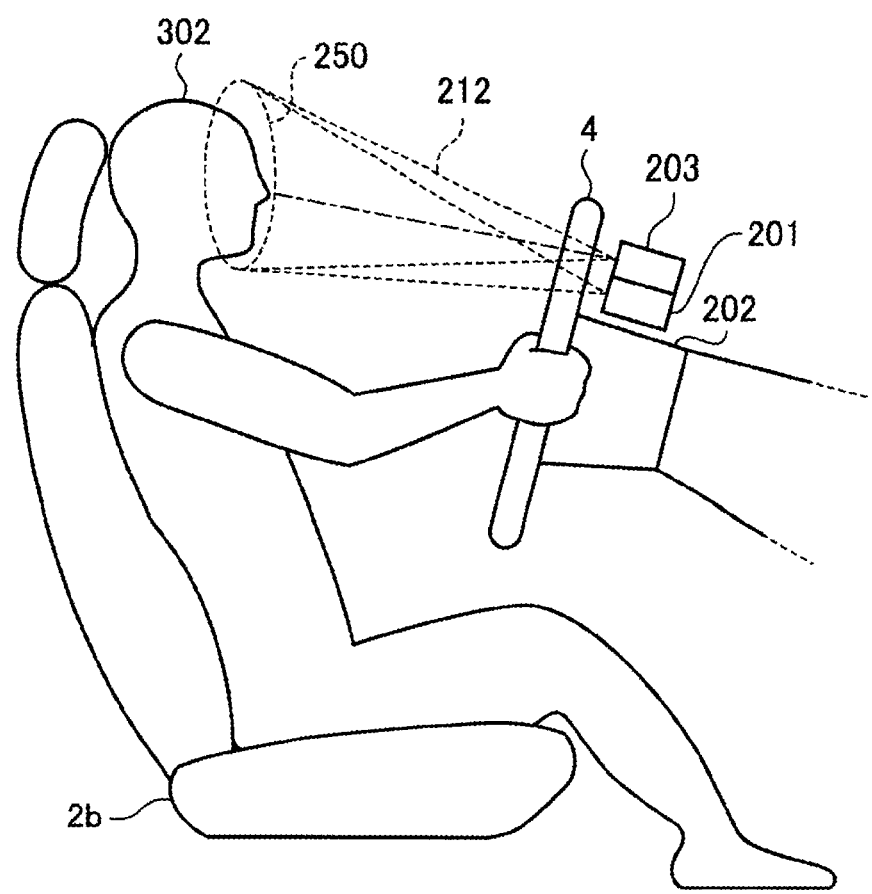
FIG. 2 is a schematic view illustrating an example of a disposition of an imaging unit and an infrared irradiator for imaging an image used by the eyeball information estimation device according to the embodiment.

Further, as illustrated in FIG. 2, in the vehicle interior 2a, an imaging unit 201 and an infrared irradiator 203 (light source) are provided in a steering wheel column 202 that supports the steering unit 4. The infrared irradiator 203 can be, for example, a light emitting diode (LED) light that emits infrared rays. The imaging unit 201 can be, for example, a charge coupled device (CCD) camera or the like corresponding to imaging by the infrared rays.

The imaging unit 201 is adjusted in viewing angle and posture such that a face of a driver 302 seated on the seat 2b is positioned at the center of a viewing field. Further, the infrared irradiator 203 is adjusted such that an optical axis of the light emitted by the infrared irradiator 203 is in proximity to the face of the driver 302 seated on the seat 2b.

As a result of the adjustment described above, in a case where a person is seated on the seat 2b of the vehicle 1, the infrared irradiator 203 emits infrared rays 212 to a range 250 where the face of the person may exist. The infrared rays 212 are not recognized as light by the human eye. Therefore, even when the infrared rays are emitted toward the face of the person, the person who became an irradiation target does not feel dazzling. Accordingly, while ensuring the comfort at the time of driving, the imaging of the face of the person by the imaging unit 201 becomes easy.

As a result of the adjustment described above, the imaging unit 201 images the range 250 where the face of the person may exist, to which the infrared irradiator 203 emits the infrared rays. Then, for example, while the driving of the vehicle 1 is being performed, the imaging unit 201 can continue imaging of the face of the driver 302 and can sequentially output moving image data (captured image data) at a predetermined frame rate. In this case, the captured image data can include a virtual image (hereinafter, referred to as a "Purkinje image") that appears in a case where the infrared rays emitted from the infrared irradiator 203 are reflected by a corneal surface of the eye of the driver 302. The Purkinje image does not appear, for example, in a case where the eyelid is closed because the Purkinje image appears on the corneal surface of the eye. In addition, there are a case where the Purkinje image appears and a case where the Purkinje image does not appear in accordance with the degree of opening of the eyelid (eyelid opening degree). The details of the Purkinje image will be described later.

In a case where an infrared camera is used as the imaging unit 201, it is difficult to be affected by ambient light, and it is possible to excellently perform imaging of a region where the face may exist without giving the driver 302 a sense of discomfort. In addition, a visible light camera may be used as the imaging unit 201. In this case, instead of the infrared irradiator 203, a projector that emits visible light can be used. In this case, it is possible to contribute to simplifying the system, and the like. However, in this case, it is desirable that the disposition of the projector or the adjustment of the light quantity be performed to make it difficult for the occupant, such as the driver 302, to feel glare caused by visible light. In addition, the installation position of the imaging unit 201 and the infrared irradiator 203 are not limited to the steering wheel column 202, when it is possible to image the range 250 where the face of the driver 302 may exist generally from a front surface, the installation position can be changed appropriately. For example, the imaging unit 201 and the infrared irradiator 203 may be provided on the dashboard 12, or may be installed on a ceiling, a room mirror, or the like. In addition, the imaging unit 201 and the infrared irradiator 203 may be provided separately from each other.

The eyeball information estimation device of the embodiment suppresses deterioration of estimation accuracy of the eyeball center position as eyeball information while calculating the sight line angle (sight line direction) of the driver 302, and consequently improves the calculation accuracy of the sight line angle. Specifically, the eyeball information estimation device suppresses deterioration of the estimation accuracy of the eyeball center position by updating the eyeball center position which can be estimated along with the calculation of the sight line angle only in a case where the conditions under which the calculation of the sight line angle can be achieved with high accuracy are satisfied. Then, as a result, it is possible to calculate a more accurate sight line angle by using the updated eyeball center position.

In a case of the embodiment, when calculating the sight line angle, any of the known first sight line angle calculation processing and the known second sight line angle calculation processing is selectively used based on a state (contents) of the image captured by the imaging unit 201. First, an outline of the first sight line angle calculation processing and the second sight line angle calculation processing will be described.

Figure 3:
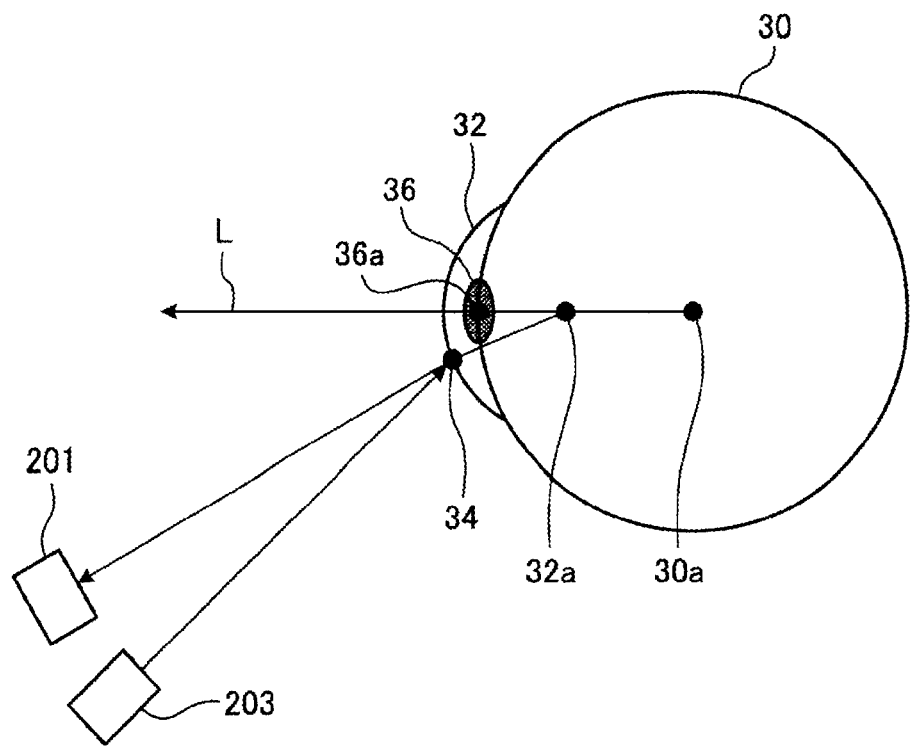
FIG. 3 is a schematic view describing an outline of first sight line angle calculation processing for calculating a sight line angle using a center position of a pupil and a position of a Purkinje image, which can be used in the eyeball information estimation device according to the embodiment.

FIG. 3 is a view for describing an outline of a so-called "corneal reflection method" which is the first sight line angle calculation processing in the embodiment. The corneal reflection method is a method for detecting a sight line angle L (sight line direction) based on a positional relationship between a center position 36a of a pupil 36 and a position of a Purkinje image 34 in which light of the infrared irradiator 203 appears on a cornea 32 (appear in a case of being reflected from the surface of the cornea 32) positioned in a front portion of the eyeball 30. The position of the Purkinje image 34 moves in parallel with the eyeball motion due to a difference (difference in rotation center) between a corneal curvature center position 32a of the cornea 32 and an eyeball center position 30a. Therefore, for example, when the pupil 36 is closer to the outer corner side of the eye than the Purkinje image 34 of the left eye, the driver 302 can be considered to be looking in the left direction. In addition, when the pupil 36 is closer to the inner corner side of the eye than the Purkinje image 34 of the left eye, the driver 302 can be considered to be looking in the right direction.

Figure 4:
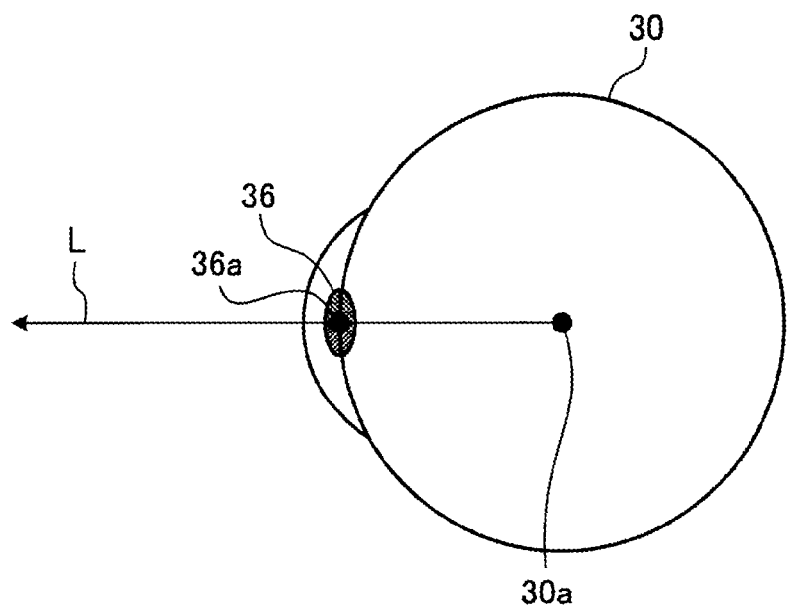
FIG. 4 is a schematic view describing an outline of second sight line angle calculation processing for calculating a sight line angle using the center position of the pupil and an eyeball center position, which can be used in the eyeball information estimation device according to the embodiment.

FIG. 4 is a view for describing an outline of a so-called "eyeball model method" which is the second sight line angle calculation processing in the embodiment. The eyeball model method is a method for detecting a direction that connects the center position 36a and the eyeball center position 30a to each other as the sight line angle L (sight line direction) by using the center position 36a of the pupil 36 and the eyeball center position 30a that is statistically obtained in advance in the eyeball 30.

Figure 5:
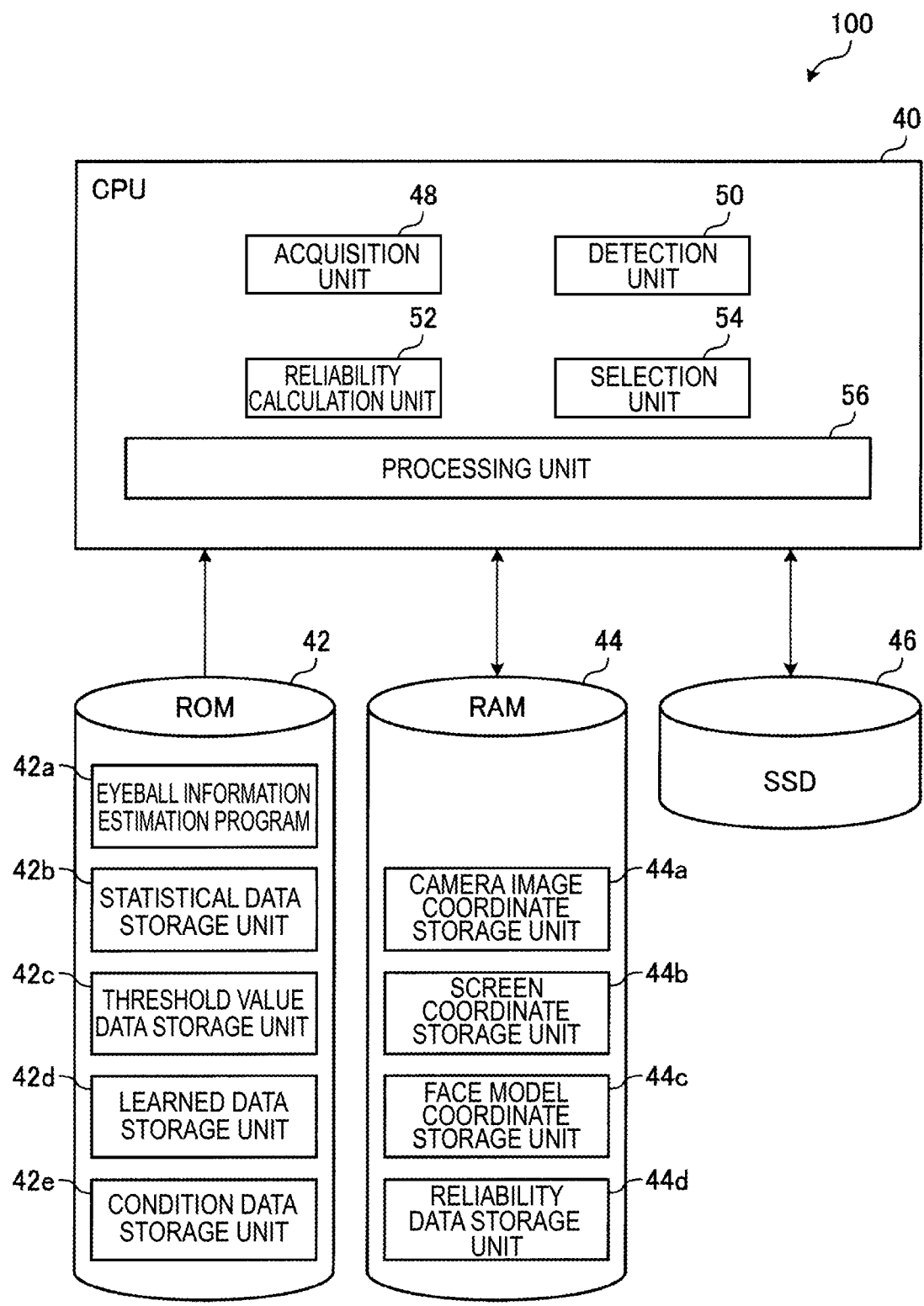
FIG. 5 is a block diagram exemplarily illustrating a configuration of the eyeball information estimation device according to the embodiment.

FIG. 5 is a block diagram exemplarily illustrating a configuration of the eyeball information estimation device 100 according to the embodiment. In the embodiment, the eyeball information estimation device 100 cooperates with hardware and software (eyeball information estimation program) to execute processing of sequentially calculating the sight line angle L (sight line direction) of the driver 302 which is an example of an estimation target of the eyeball information from the captured image data captured by the imaging unit 201, and to execute estimation processing of the eyeball center position. The eyeball information estimation device 100 can be realized on a computer configured with a storage unit, such as a central processing unit (CPU) 40, a read only memory (ROM) 42, a random access memory (RAM) 44, and a solid state drive (SSD, flash memory) 46. In addition, in a case where the eyeball information estimation device 100 is mounted on the vehicle 1, the eyeball information estimation device 100 may be realized in the CPU of a plurality of electronic control units (ECU) that control the vehicle 1, may be realized by another ECU different from the ECU for vehicle control, or may be mounted as the independent eyeball information estimation device 100.

The CPU 40 can read an eyeball information estimation program 42a installed and stored in a non-volatile storage device, such as the ROM 42, and can execute arithmetic processing in accordance with the eyeball information estimation program 42a. In addition to the eyeball information estimation program 42a, statistical data stored in a statistical data storage unit 42b, threshold value data stored in a threshold value data storage unit 42c, learned data stored in a learned data storage unit 42d, condition data stored in a condition data storage unit 42e, and the like are stored in the ROM 42. The RAM 44 is used as a work area when the eyeball information estimation program 42a is executed by the CPU 40, and is also used as a temporary storage area of various data used in the calculation by the CPU 40. In the RAM 44, for example, a camera image coordinate storage unit 44a that stores camera coordinate data, a screen coordinate storage unit 44b that stores screen coordinate data to be processed, a face model coordinate storage unit 44c that stores face model coordinate data, a reliability data storage unit 44d that stores the reliability data, and the like are provided. In addition, the SSD 46 is a rewritable non-volatile storage unit, and can store data even in a case where the power source of the eyeball information estimation device 100 is turned off. The CPU 40, the ROM 42, the RAM 44 and the like can be integrated in the same package. Further, the eyeball information estimation device 100 may be configured to use another logical operation processor, such as a digital signal processor (DSP), or a logic circuit, instead of the CPU 40. In addition, a hard disk drive (HDD) may be provided instead of the SSD 46, and the SSD 46 or the HDD may be provided separately from the eyeball information estimation device 100.

The CPU 40 includes various modules for realizing the function of the eyeball information estimation device 100. For example, as illustrated in FIG. 5, the CPU 40 realizes an acquisition unit 48, a detection unit 50, a reliability calculation unit 52, a selection unit 54, a processing unit 56, and the like. In addition, the modules may be configured as dedicated hardware.

The acquisition unit 48 sequentially acquires captured image data captured by the imaging unit 201, and stores the captured image data in the camera image coordinate storage unit 44a of the RAM 44 for each frame. The acquisition unit 48 may acquire the captured image data sequentially captured by the imaging unit 201, or the acquisition unit 48 may cause the imaging unit 201 to execute imaging processing at a predetermined timing to acquire the captured image data.

The detection unit 50 reads the captured image data from the camera image coordinate system storage unit 44a, and detects the position or face components (for example, mouth, nose, and eyes) of the face of the driver 302. In addition, the acquisition unit 48 detects face feature points (for example, mouth, nose, and eyes (outer corner of an eye, inner corner of an eye)) of the face, in the region where the face of the driver 302 is detected. Various known techniques can be used as techniques for detecting the position, face components, face feature points, and the like of the face of the driver 302, but for example, a technique using a neural network (NN), an individual face template, and the like can be used. In another method, for example, a known three-dimensional model fitting technique can be used. The detection unit 50 detects the position, face components, face feature points, and the like of the face of the driver 302 by moving, rotating, scaling and the like of a temporary model with reference to the feature points defined in a statistical face shape model stored in advance in the statistical data storage unit 42b of the ROM 42, that is, the temporary model of average face created in advance, as an initial state. At this time, face position coordinates on the image of the driver 302, a face direction angle, and the like are also detected.

Further, the detection unit 50 detects an upper eyelid and a lower eyelid with reference to the detected inner and outer corners of an eye. For example, a curve fitting technique or the like can be used as a technique for detecting the upper and lower eyelids. The detection unit 50 can calculate the eyelid opening degree based on the calculated distance between the upper and lower eyelids. In addition, the detection unit 50 detects the pupil 36 and the center position 36a of the pupil 36 in the captured image data. Furthermore, the detection unit 50 detects the Purkinje image 34 in the captured image data from a neighboring region between the detected upper and lower eyelids. The pupil 36 or the Purkinje image 34 is created by a machine learning technique, such as deep learning to learn based on the correct answer information and the incorrect answer information on a large amount of face components positions acquired in the past or the Purkinje image 34, and can be detected using the learned data stored in the learned data storage unit 42d of the ROM 42.

Figure 6:
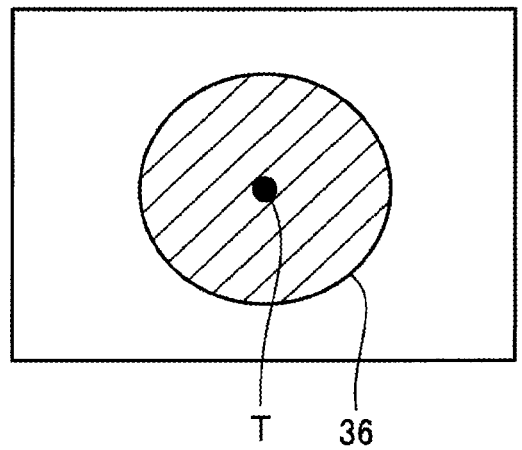
FIG. 6 is an exemplary schematic view describing correct answer information used for learning in deep learning that can be used in the eyeball information estimation device according to the embodiment.
Figure 7:
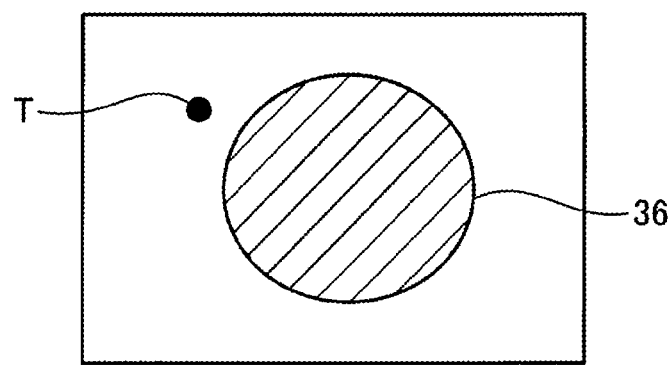
FIG. 7 is an exemplary schematic view describing incorrect answer information used for learning in deep learning that can be used in the eyeball information estimation device according to the embodiment.

Here, as an example, in deep learning, the correct answer information and the incorrect answer information used for learning will be described using FIGS. 6 and 7.

The correct answer information of the pupil 36 can be defined as an image in the vicinity of the eye in which the pupil center is appropriately indicated by a tag T in a projection image based on the captured image data. Meanwhile, the incorrect answer information of the pupil 36 can be defined as an image in the vicinity of the eye in which the tag T is indicated at a position deviated from an original position of the pupil center in the captured image. In addition, in order to perform learning, the correct answer information defined as described above and the incorrect answer information are prepared. FIG. 6 illustrates an example of the correct answer information of the pupil 36, and FIG. 7 illustrates an example of the incorrect answer information of the pupil 36. Regarding the correct answer information, for example, a case where the user manually sets the tag T can be considered. Meanwhile, for the incorrect answer information, after the user sets (generates) a rule for generating the incorrect answer information, the information processing device, such as a personal computer, generates a plurality of pieces of incorrect answer information based on the set rule. Accordingly, it is possible to generate a large amount of incorrect answer data in a well-balanced manner.

Further, the learned data storage unit 42d can store the learned data created by a machine learning technique, such as deep learning, based on the correct answer information and the incorrect answer information of the Purkinje image 34. The correct solution information of the Purkinje image 34 can be defined as an image in the vicinity of the eye in which the center of Purkinje is indicated by the tag T in the captured image. The incorrect solution information of the Purkinje image 34 can be defined as an image in the vicinity of the eye in which the tag T is indicated at a position shifted from the center of the original Purkinje. Since the technique of generating the correct answer information and the incorrect answer information of the Purkinje image 34 is the same as the technique of generating the correct answer information and the incorrect answer information of the pupil 36, the description thereof will be omitted. In the embodiment, the learned data can be similarly generated for items other than the pupil 36 or the Purkinje image 34.

Then, the learned data based on the correct answer information and the incorrect answer information generated as described above is stored in the learned data storage unit 42d. Accordingly, the detection unit 50 and the reliability calculation unit 52 can calculate a score indicating a likelihood of being the pupil 36 and the Purkinje image 34 based on the learned data. For example, data determined to be similar to the correct answer information of the learned pupil 36 is data (data with high score) with high likelihood of being the pupil 36, and data determined to be similar to the incorrect answer information of the learned pupil 36 is data (data with low score) with low likelihood of being the pupil 36. In this manner, using the learned data, a score indicating the likelihood of being the pupil 36 is added to the captured image data (captured image), and in a case where the score is higher than a predetermined value, it is determined to be the pupil 36. Similarly, using the learned data, a score indicating the likelihood of being the Purkinje image 34 is added to the captured image data, and in a case where the score is higher than a predetermined value, it is determined to be the Purkinje image 34. In addition, the pupil 36 or the Purkinje image 34 may be detected, for example, by analyzing a luminance value in proximity between the upper and lower eyelids. The detection unit 50 stores various detection results in the camera image coordinate storage unit 44a or the face model coordinate storage unit 44c, and in a case where the processing is performed with respect to the next image, it is possible to use the detection result of the previous processing, and it is possible to easily detect the region (position) or each face component of the face, the direction of the face, and the like.

The reliability calculation unit 52 calculates a reliability of the target considered to be a face component appearing in the captured image data, for example, a pupil reliability indicating the likelihood of being the pupil 36, a Purkinje reliability indicating the likelihood of being the Purkinje image 34, an eye reliability indicating that the target is an eye, and the like. For example, in a case of detecting the pupil 36, the Purkinje image 34 and the like using the learned data created by a machine learning technique, such as deep learning, a score indicating the likelihood of each is given in the processing. The reliability calculation unit 52 calculates the score as each reliability. In other words, the higher the score, the higher the possibility of being the pupil 36 and the higher possibility of being the Purkinje image 34. The reliability calculation unit 52 stores each calculated reliability in the reliability data storage unit 44d of the RAM 44.

The selection unit 54 selects which of the corneal reflection method (first sight line angle calculation processing) described in FIG. 3 and the eyeball model method (second sight line angle calculation processing) described in FIG. 4 is to be executed when calculating the sight line angle. The selection unit 54 selects the processing method based on, for example, comparison of the pupil reliability and the Purkinje reliability calculated by the reliability calculation unit 52 with the threshold value data stored in the threshold value data storage unit 42c of the ROM 42. The threshold value data storage unit 42c stores, for example, a first pupil threshold value or a first Purkinje threshold value referred to when determining whether to estimate and update the eyeball center position in the processing unit 56 (will be described later), a second pupil threshold value having a threshold value lower than the first pupil threshold value or a second Purkinje threshold value having a threshold value lower than the first Purkinje threshold value, which is referred to by the selection unit 54, and the like.

In addition, in the image currently being processed, the selection unit 54 may not execute the sight line angle calculation processing in a case where the pupil reliability of the pupil 36 is equal to or lower than the second pupil threshold value, for example, in a case where the pupil 36 cannot be recognized. Therefore, in the image currently being processed, the selection unit 54 selects which of the corneal reflection method (first sight line angle calculation processing) based on the Purkinje reliability and the eyeball model method (second sight line angle calculation processing) is executed in a case where the pupil reliability of the pupil 36 is higher than the second pupil threshold value, that is, in a case where the pupil 36 can generally be recognized.

The threshold value data storage unit 42c includes a plurality of threshold values, such as an eye threshold value, a fitting threshold value, an angle change threshold value, a face position determination threshold value, a face direction determination threshold value, and an eye threshold value, in addition to the first and second pupil threshold values and the first and second Purkinje threshold values described above. In addition, the eye threshold value is a threshold value to be referred to when calculating the eye reliability indicating the likelihood of being an eye. The angle change threshold value is a threshold value to be referred to when determining whether a change amount of the sight line angle calculated in the sight line angle calculation processing is within an allowable value, in each processing cycle of the eyeball information estimation device. The face position determination threshold value is a threshold value to be referred to when determining whether the position of the face of the driver 302 (subject) is within a predetermined region of the image acquired by the acquisition unit 48. The fitting threshold value is a threshold value to be referred to when determining the degree of matching between the face feature points of the face of the driver 302 and the three-dimensional fitting model. The face direction determination threshold value is a threshold value referred to when it is determined whether the face direction of the driver 302 is in a predetermined direction, for example, being oriented toward the front surface, in the image acquired by the acquisition unit 48. Further, the pupil threshold value is a threshold value to be referred to in a case of determining the degree of eyelid opening.

The processing unit 56 executes the sight line angle calculation in accordance with the sight line angle calculation processing selected by the selection unit 54. For example, in a case where the corneal reflection method (first sight line angle calculation processing) is selected, the sight line angle is calculated based on the center position 36a of the pupil 36 detected by the detection unit 50 and the position of the Purkinje image 34. Further, in a case where the eyeball model method (second sight line angle calculation processing) is selected, the sight line angle is calculated based on the center position 36a of the pupil 36 detected by the detection unit 50 and the eyeball center position 30a calculated in advance. In a case where the eyeball model method is executed for the first time, the eyeball center position 30a calculates the sight line angle using the statistical eyeball center position 30a stored in the statistical data storage unit 42b. In addition, in a case where the eyeball center position 30a is updated (corrected) by the processing unit 56, the updated eyeball center position 30a is referred to in the subsequent processing.

In a case where the corneal reflection method (first sight line angle calculation processing) is selected as the technique of the sight line angle calculation processing by the selection unit 54, the processing unit 56 determines whether to update the eyeball center position 30a with reference to the update condition stored in the condition data storage unit 42e of the ROM 42, and updates (corrects) the eyeball center position 30a in a case where the update condition is satisfied. For example, among the reliabilities calculated by the reliability calculation unit 52, at least in a case where the pupil reliability indicating the likelihood of being the pupil 36 is higher than the first pupil threshold value and the Purkinje reliability indicating the likelihood of being the Purkinje image is higher than the first Purkinje threshold value, it is determined that the update condition is satisfied, and the eyeball center position is updated. Here, the first pupil threshold value stored in the threshold value data storage unit 42c is set be higher (stricter) than the second pupil threshold value referred to in a case where the selection unit 54 selects which sight line angle calculation processing is to be executed. Similarly, the first Purkinje threshold value is set to be higher (stricter) than the second Purkinje threshold value which is referred to in a case where the selection unit 54 selects which sight line angle calculation processing is to be executed. Therefore, the eyeball center position is updated only in a case where the detection accuracy of the eye is higher. As a result, in a case where the detection of the eye is unstable, for example, the pupil 36 of the driver 302 (subject) or the Purkinje image 34 cannot be detected in a highly reliable state, the update in a state where the eyeball center position 30a used in the eyeball model method (second sight line angle calculation processing) includes errors is avoided. In other words, it is possible to prevent deterioration of the sight line angle detection accuracy by the eyeball model method, and to improve the reliability as the eyeball information estimation device by improving the estimation accuracy of the eyeball center position 30a.

The update condition for determining whether to update the eyeball center position 30a by the processing unit 56 may further include at least one of the eye reliability of the image currently being processed, the reliability of the three-dimensional fitting of the feature points of the face, the change amount of the sight line angle calculated previously and the sight line angle calculated at this time, and the position of the face or the face direction angle of the subject. For example, in a case where the eyeball reliability is equal to or lower than a predetermined eye threshold value, it is estimated that, for example, eyebrows or a frame of glasses is misrecognized as an eye, and thus, the update of the eyeball center position 30a is prohibited. In addition, in a case where the reliability of the three-dimensional fitting of the feature points of the face is equal to or lower than a predetermined fitting threshold value, it is estimated that, for example, a change of the driver 302 or the like occurs, or the inner corner of the eye or the outer corner of the eye is misrecognized as the pupil, and thus, the update of the eyeball center position 30a is prohibited. The update of the eyeball center position 30a is prohibited in a case where the change amount of the sight line angle changes exceeding the predetermined angle change threshold value, that is, in a case where the movement of the sight line is unstable. The reason why the movement of the sight line is unstable is a case where the actual position or the detected position of the pupil 36 on the screen is unstable (shakes), a case where the detection of the pupil 36 or the Purkinje image 34 is unstable, and the like. In addition, in a case where the position of the face of the driver 302 deviates from the predetermined region threshold value of the image, for example, in a case where the driver 302 is seated at an offset position of the seat 2b or seated in an oblique posture, and a normal driving posture is not taken, the detection of the pupil 36 becomes inaccurate, and thus, the update of the eyeball center position 30a is prohibited. Similarly, in a case where the face direction of the driver 302 deviates from the predetermined direction threshold value in the image, for example, in a case of not being oriented toward the front surface, and in a case of looking away or being in a downward or upward direction due to a nap, the detection of the pupil 36 becomes inaccurate, and thus, the update of the eyeball center position 30a is prohibited. In addition to this, the eyelid opening degree may be included in the determination condition. In a case where the eyelid opening degree is equal to or lower than a predetermined eyelid threshold value, even when it is possible to temporarily detect the pupil 36 or the Purkinje image 34, it is estimated that the detection accuracy is inaccurate, and thus, the update of the eyeball center position 30a may be prohibited. In addition, each threshold value is stored in the threshold value data storage unit 42c of the ROM 42.

Figure 8:
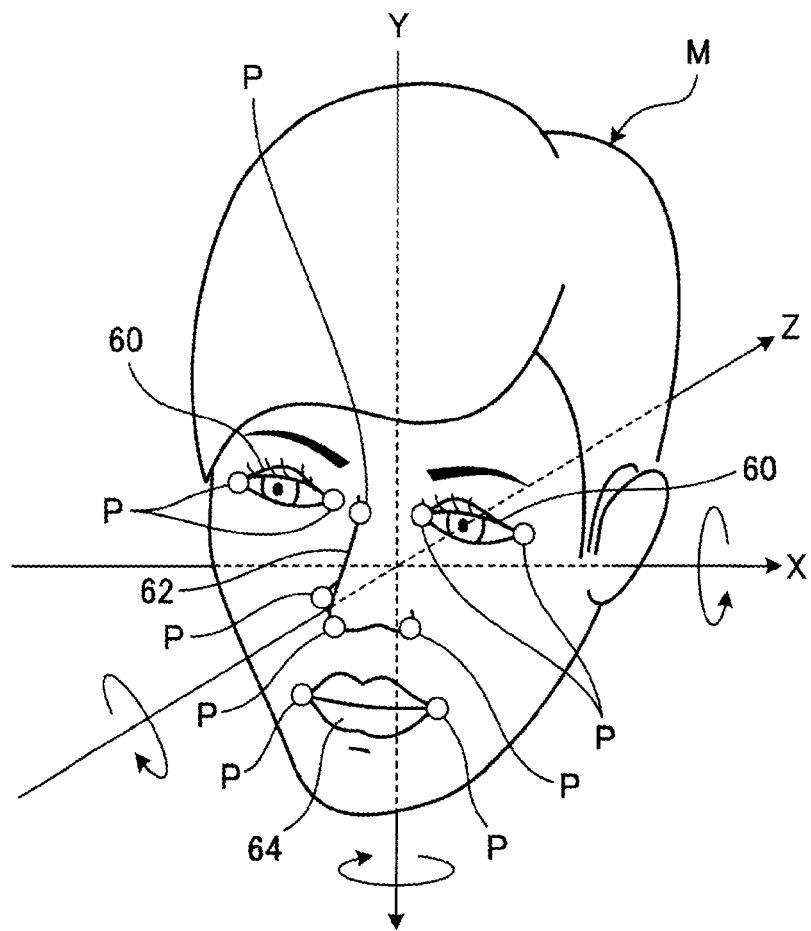
FIG. 8 is an exemplary schematic view for describing fitting of a three-dimensional face model using face feature points based on the acquired image in the eyeball information estimation device according to the embodiment.
Figure 9:
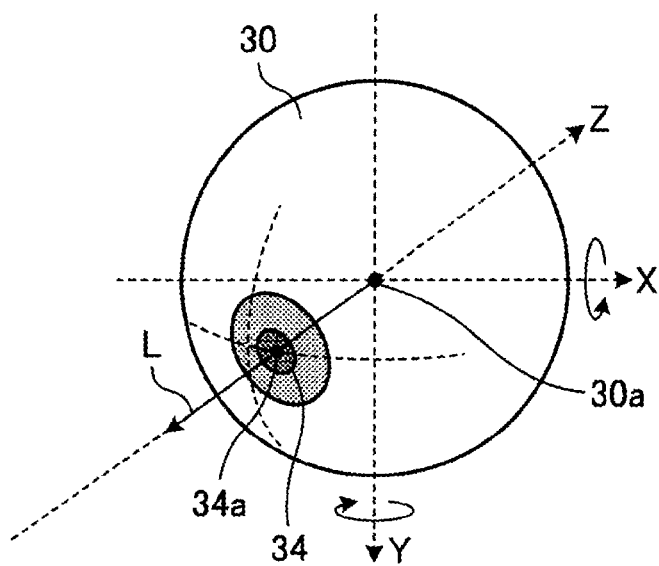
FIG. 9 is an exemplary schematic view for describing estimation of the eyeball center position in the eyeball information estimation device according to the embodiment.

As described above, in a case where the update of the eyeball center position 30a is permitted, the processing unit 56 estimates the eyeball center position 30a of the eye of the driver 302 based on the three-dimensional face model determined based on the sight line angle L calculated by the corneal reflection method (first sight line angle calculation processing). For example, as illustrated in FIG. 8, fitting to the face on the image is performed by moving, rotating, reducing, enlarging and the like a three-dimensional face model M so as to correspond to feature points P (face feature point of other outlines of an eye 60, a nose 62, a mouth 64 and the like) of the face of the driver 302 detected by the detection unit 50. When the three-dimensional face model M is a statistical face shape model and the position of the eye 60 is determined on the three-dimensional face coordinates of the three-dimensional face model M, the movement, rotation, reduction, enlargement, and the like are also performed in accordance with the eyeball 30 (illustrated in FIG. 9) that exists on the inside of the three-dimensional face model M. As a result, the position of the eyeball 30 on the three-dimensional face coordinates and the coordinates of the eyeball center position 30a can be estimated. In this case, when using the calculated sight line angle L using the corneal reflection method (first sight line angle calculation processing) by the processing unit 56, it is possible to improve the fitting accuracy of the three-dimensional face model M with respect to the face on the image. In other words, it is possible to improve the estimated accuracy of the eyeball center position 30a in the three-dimensional face model M. The processing unit 56 stores the estimated eyeball center position 30a in the face model coordinate storage unit 44c of the RAM 44. The eyeball center position 30a stored at this time is referred to in a case where the eyeball model method (second sight line angle calculation processing) is executed in the next processing. As a result, it is possible to improve the calculation accuracy of the sight line angle by the eyeball model method.

In addition, a module configuration illustrated in FIG. 5 is an example, and when similar processing can be performed, division or integration of functions are possible appropriately.

Figure 10:
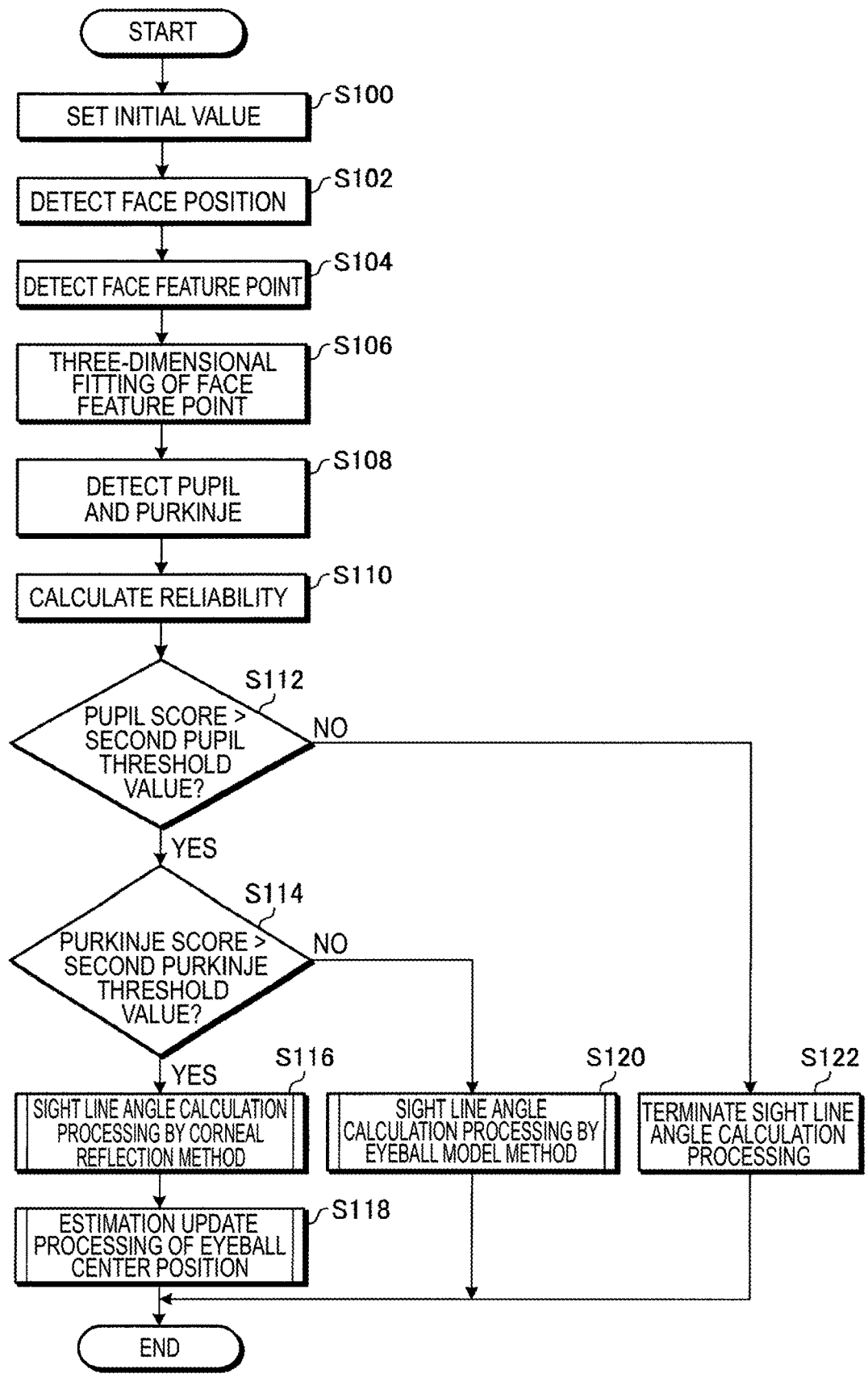
FIG. 10 is a flowchart illustrating an example of a flow of sight line angle calculation processing and processing of updating the eyeball center position in the eyeball information estimation device according to the embodiment.
Figure 11:
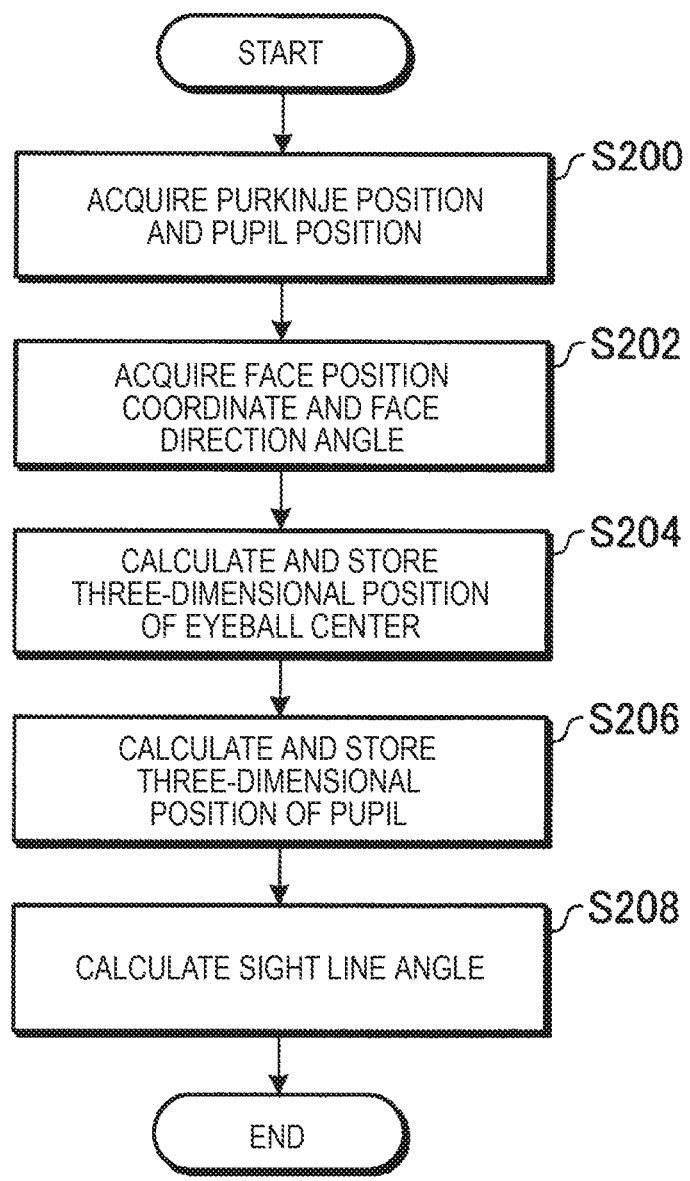
FIG. 11 is a flowchart illustrating an example of a flow of a corneal reflection method (first sight line angle calculation processing) in the flowchart of FIG. 10.
Figure 12:
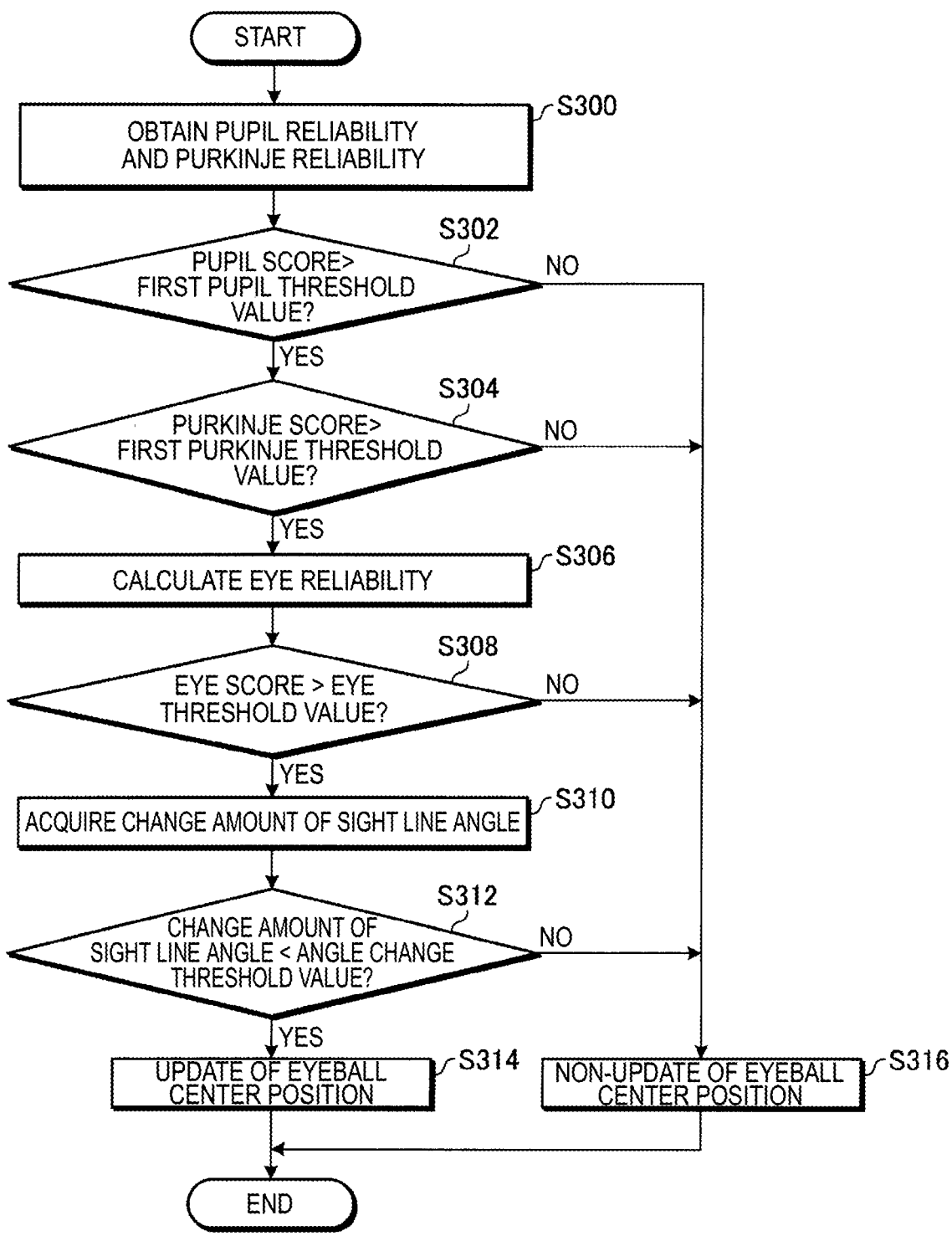
FIG. 12 is a flowchart illustrating an example of a detailed processing flow of estimation update processing of the eyeball center position in the flowchart of FIG. 10.
Figure 13:
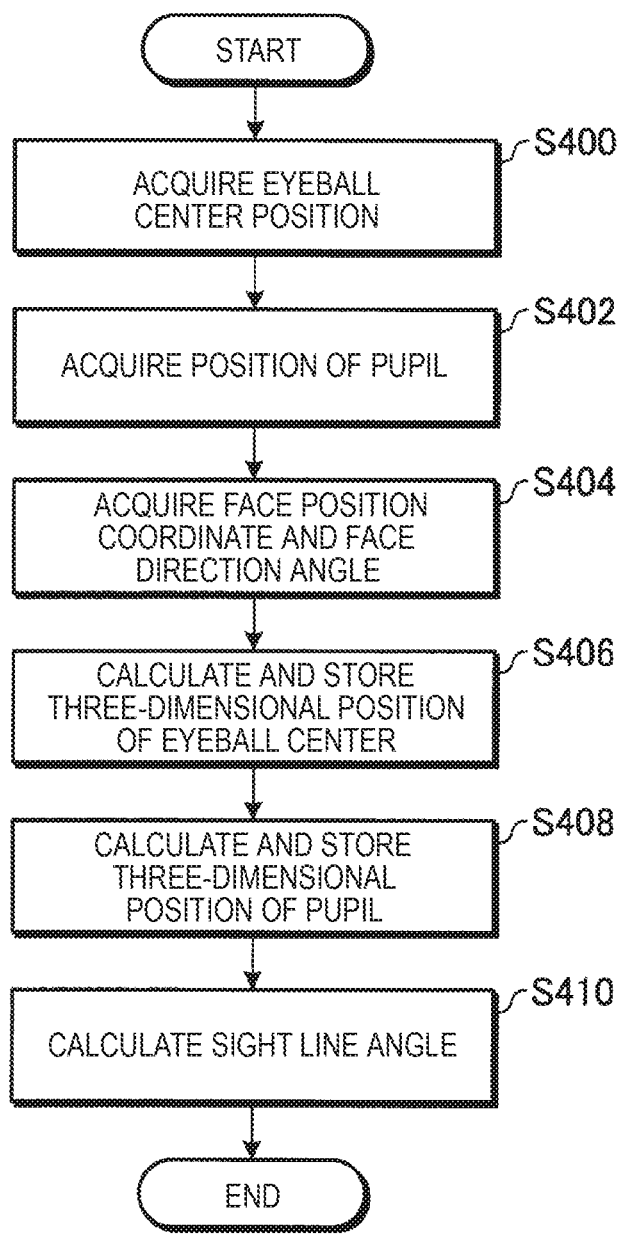
FIG. 13 is a flowchart illustrating an example of a flow of a corneal model method (second sight line angle calculation processing) in the flowchart of FIG. 10.

An example of the flow of the calculation of the sight line angle L and the update processing of the eyeball center position 30a by the eyeball information estimation device 100 configured as described above will be described using the flowcharts of FIGS. 10 to 13. In addition, FIG. 10 is a main flowchart, FIG. 11 is a detailed flowchart of the sight line angle calculation processing by the corneal reflection method, FIG. 12 is a detailed flowchart of estimation update processing of the eyeball center position 30a, and FIG. 13 is a detailed flowchart of sight line angle calculation processing by the eyeball model method.

The imaging unit 201 and the infrared irradiator 203 are always in an enabled state, for example, in a state where the power source of the vehicle 1 turned on, and the imaging unit 201 is a unit that sequentially images a region where the face of the driver 302 seated on the seat 2b may exist. In addition, it is assumed that the captured image data is sequentially stored in the RAM 44 by the acquisition unit 48.

When the eyeball information estimation device 100 starts to operate, first, the acquisition unit 48 acquires the eyeball center position (initial value: face model coordinate data) statistically determined in advance from the statistical data storage unit 42b of the ROM 42, or the three-dimensional face model M (initial model), and executes the initial value setting stored in the face model coordinate storage unit 44c of the RAM 44 (S100). Subsequently, the detection unit 50 acquires the captured image data to be processed from the camera image coordinate storage unit 44a (acquiring step), and executes the face position detection for detecting a face position or a face component (for example, eye, nose, mouth, and skeleton) (S102). In addition, the detection unit 50 detects the face feature points P that correspond to the detected face components (S104). Furthermore, by using the detected face feature points P, the detection unit 50 executes the three-dimensional fitting of the face feature points P detected on the captured image data (image) and the face feature points P determined by the three-dimensional face model M (initial model) (S106). Based on the three-dimensional face model M which has been fitted, moved, rotated, and scaled by the three-dimensional fitting, the detection unit 50 detects the face position coordinates or the face direction angle on the screen and stores the detected face position coordinates or the face direction angle in the face model coordinate storage unit 44c of the RAM 44.

Subsequently, the detection unit 50 detects the pupil 36, the center position 36a of the pupil 36, and the Purkinje image 34 from the neighboring region between the upper and lower eyelids among the detected face components in the captured image data (S108: detecting step). In addition, the detection unit 50 stores the detected pupil 36 (position coordinates of the center position 36a) and the Purkinje image 34 (position coordinates) in the screen coordinate storage unit 44b of the RAM 44. Next, the reliability calculation unit 52 calculates the reliability with respect to the pupil 36 and the Purkinje image 34 stored in the screen coordinate storage unit 44b with reference to each threshold value data of the threshold value data storage unit 42c (S110), and stores the calculated reliability in the reliability data storage unit 44d.

The selection unit 54 determines whether to execute the sight line angle calculation processing using the reliability of the pupil 36 calculated in S110 (S112), and then selects the method of the sight line angle calculation processing (S114). In the selection unit 54, in a case where the pupil score of the reliability of the pupil 36 is higher than the second pupil threshold value (Yes in S112), and the Purkinje score of the reliability of the Purkinje image 34 is higher than the second Purkinje threshold value (Yes in S114), the selection unit 54 selects the corneal reflection method (first sight line angle calculation processing) (selecting step). Then, the processing unit 56 executes the sight line angle calculation processing by the corneal reflection method (S116).

FIG. 11 is a flowchart illustrating in detail an example of the corneal reflection method. The processing unit 56 acquires the position of the Purkinje image 34 and the position of the pupil 36 detected in S108 from the screen coordinate storage unit 44b (S200). Further, the processing unit 56 acquires the face position coordinates and the face direction angle acquired by the three-dimensional fitting in S106 from the face model coordinate storage unit 44c (S202). Subsequently, the processing unit 56 calculates the temporary eyeball center position 30a in the camera coordinate system and the face model coordinate system based on the acquired position of the pupil 36, the position of the Purkinje image 34, the face position coordinates, and the face direction angle, and stores the calculated temporary eyeball center position 30a in each of the camera image coordinate storage unit 44a and the face model coordinate storage unit 44c (S204). Further, the processing unit 56 calculates the three-dimensional position of the pupil 36 of the camera coordinate system based on the position of the pupil 36 acquired from the screen coordinate storage unit 44b, and stores the calculated three-dimensional position in the camera image coordinate storage unit 44a (S206). Then, based on the temporary eyeball center position 30a and the position of the pupil 36, the processing unit 56 calculates the sight line angle (S208), stores the calculated sight line angle in the RAM 44, and temporarily ends the flow.

Returning to FIG. 10, when the sight line angle calculation processing by the corneal reflection method is completed, the processing unit 56 executes the estimation update processing of the eyeball center position (S118: processing step).

FIG. 12 is a flowchart illustrating in detail an example of the estimation update processing of the eyeball center position. The processing unit 56 obtains, for example, the pupil reliability and the Purkinje reliability calculated in S110 and stored in the reliability data storage unit 44d (S300). In a case where the pupil score of the reliability of the pupil 36 is higher than the first pupil threshold value (Yes in S302), and the Purkinje score of the reliability of the Purkinje image 34 is higher than the first Purkinje threshold value (Yes in S304), the processing unit 56 causes the reliability calculation unit 52 to calculate the eye reliability (S306). Then, in a case where the eye score is higher than the eye threshold (Yes in S308), the processing unit 56 calculates the change amount between the sight line angle L of the current processing calculated in S116 and the sight line angle L calculated in the previous processing (S310). In addition, in a case where the eyeball information estimation device 100 is executing the first processing, the sight line angle of the previous processing does not exist, and thus, the sight line angle calculated by the corneal reflection method of the current processing becomes the change amount. In addition, in a case where the sight line angle is calculated by the corneal reflection method or the eyeball model method as the previous processing, the difference between the sight line angle calculated in the previous processing and the sight line angle calculated in the current processing becomes the change amount. In the processing unit 56, in a case where the calculated change amount of the sight line angle is less than the angle change threshold value read from the threshold value data storage unit 42c (Yes in S312), it is determined that the sight line angle calculation processing by the corneal reflection method in the current processing is excellently performed, and as described in FIGS. 8 and 9, the eyeball center position 30a is estimated based on the three-dimensional face model M determined based on the calculated sight line angle L, and the eyeball center position 30a temporarily calculated by the angle reflection method is updated (corrected) by the estimated eyeball center position 30a (S314). The processing unit 56 stores (updates) the corrected eyeball center position 30a in the face model coordinate storage unit 44c. As described above, the eyeball center position 30a is updated in a case where the change amount of the sight line angle L is less than the angle change threshold value. In other words, in a case where the sight line angle L is stably calculated continuously a plurality of times (at least two times), the eyeball center position 30a is updated. As a result, it is possible to improve the update reliability of the eyeball center position 30a.

In S302, in a case where the pupil score of the reliability of the pupil 36 is equal to or lower than the first pupil threshold value (No in S302), the processing unit 56 determines that the detection accuracy of the pupil 36 is low and does not update the eyeball center position 30a (S316). In S304, in a case where the Purkinje score of the reliability of the Purkinje image 34 is equal to or lower than the first Purkinje threshold value (No in S304), the processing unit 56 determines that the detection accuracy of the Purkinje image 34 is low. Further, in S308, in a case where the eye score is equal to or lower than the eye threshold value (No in S308), the processing unit 56 determines that the detection accuracy of the eye 60 is low. In S312, in a case where the change amount of the sight line angle is larger than the angle change threshold value (No in S312), the processing unit 56 determines, for example, that the face detection accuracy is low. In other words, in any case, it is determined that the estimated accuracy of the eyeball center position 30a based on the three-dimensional face model determined based on the sight line angle calculated by the corneal reflection method is low, and the eyeball center position 30a is not updated (S316).

Returning to FIG. 10, when the estimated update processing of the eyeball center position in S118 is completed, the flow is temporarily ended. In addition, in S114, in a case where the Purkinje score of the reliability of the Purkinje image 34 is equal to or lower than the second Purkinje threshold value (No in S114), the selection unit 54 selects the eyeball model method (second eye sight line angle calculation processing) (selecting step), and the processing unit 56 executes the eye sight line angle calculation processing by the eyeball model method (S120).

FIG. 13 is a flowchart illustrating an example of the eyeball model method in detail. In a case where the eyeball model method is executed for the first time, the processing unit 56 acquires the statistical eyeball center position 30a as the initial value stored in the face model coordinate storage unit 44c in S100 (S400). In addition, in S314, in a case where the eyeball center position 30a is updated, the updated eyeball center position 30a is acquired (S400). In addition, the processing unit 56 acquires the position of the pupil 36 detected in S108 from the screen coordinate storage unit 44b (S402). Further, the processing unit 56 acquires the face position coordinates and the face direction angle acquired by the three-dimensional fitting in S106 from the face model coordinate storage unit 44c (S404). The processing unit 56 calculates the eyeball center position 30a in the camera coordinate system based on the acquired eyeball center position 30a, the face position coordinates, and the face direction angle, and stores the calculated eyeball center position 30a in the camera image coordinate system storage unit 44a (S406). Further, the processing unit 56 calculates the three-dimensional position of the pupil 36 in the camera coordinate system based on the position of the pupil 36, and stores the calculated three-dimensional position in the camera image coordinate storage unit 44a (S408). Then, based on the eyeball center position 30a and the position of the pupil 36 in the camera coordinates, the processing unit 56 calculates the sight line angle (S410), and stores the calculated sight line angle in the RAM 44. The sight line angle stored here is also referred to when the sight line angle change amount is calculated in S310.

Returning to FIG. 10, in a case where the sight line angle calculation processing by the eyeball model method is completed in S120, the flow is temporarily ended without executing the estimation update processing of the eyeball center position in S118. In addition, in S112, in a case where the pupil score of the reliability of the pupil 36 is equal to or lower than the second pupil threshold value (No in S112), the selection unit 54 determines that the pupil 36 cannot be substantially detected, the sight line angle calculation processing is terminated (S122), and the flow is temporarily ended.

In this manner, according to the eyeball information estimation device 100 of the embodiment, the eyeball center position 30a is updated only in a case where the predetermined update condition is satisfied, for example, in a case where the pupil reliability, the Purkinje reliability, and the like are higher than the predetermined threshold value. As a result, it is possible to avoid that the eyeball center position is estimated by a value having a low reliability. Therefore, it is possible to suppress deterioration of the sight line angle calculation accuracy using the eyeball center position in the subsequent processing, and to contribute to the maintenance or improvement of the calculation accuracy of the sight line calculation angle as a whole.

Although the flowchart illustrated in FIG. 12 illustrates a case where the pupil reliability, the Purkinje reliability, the eye reliability, and the sight line angle reliability are used as the update condition, the update condition is an example, and at least the pupil reliability and the Purkinje reliability are included, the update condition can be appropriately increased or decreased. For example, it is possible to select and add at least one of the update conditions, such as conditions in which the reliability of three-dimensional fitting of the feature points of the face of the driver 302 is higher than the predetermined fitting threshold value, the position of the face of the driver 302 is within a predetermined region of the image, the direction of the face of the driver 302 is a predetermined direction in the image, and the eyelid opening degree exceeds a predetermined eyelid threshold values. In this manner, by increasing and decreasing the number of update conditions, it is possible to adjust the reliability of the eyeball center position 30a, and further, to adjust the reliability of the eyeball information estimation device 100.

In the above-described embodiment, a case where the eyeball information estimation device 100 is applied to the driver 302 seated on the seat 2b of the vehicle 1 is described, but even when the eyeball information estimation device 100 is applied to the other occupants seated on the other seats 2b of the vehicle 1, similar effects can be obtained. Further, the disclosure is not limited to the person who is onboard on the vehicle 1, but can be applied to the person whose face exists in the imaging range of the imaging unit 201, such as a person seated or standing on a chair and the like in a room, such as a measurement room, and similar effects can be obtained.

A program for the eyeball information estimation processing executed by the CPU 40 of the embodiment (eyeball information estimation program) may be configured to be recorded and provided in a readable recording medium in a computer, such as a CD-ROM, a flexible disk (FD), a CD-R, and a digital versatile disk (DVD), as a file in an installable format or an executable format.

Furthermore, the eyeball information estimation program may be configured to be stored on a computer connected to a network, such as the Internet, and provided by being downloaded via a network. In addition, the eyeball information estimation program executed in the embodiment may be configured to be provided or distributed via the network, such as the Internet.

In the eyeball information estimation device according to the aspect of the disclosure, for example, the condition for updating the eyeball center position by the processing unit may further include at least one of conditions in which an eye reliability indicating a likelihood of being the eye of the subject is higher than a predetermined eye threshold value, a reliability of a three-dimensional fitting of feature points of a face of the subject is higher than a predetermined fitting threshold value, a change amount of the sight line angle calculated in the first sight line angle calculation processing with respect to a sight line angle calculated in the previous processing is less than a predetermined angle change threshold value, a position of the face of the subject is within a predetermined region of the image, and a face direction of the subject is a predetermined direction in the image. According to this configuration, for example, by making the conditions for permitting the estimation of the eyeball center position stricter, the eyeball center position is estimated in a more reliable situation, and it is possible to further suppress deterioration of the estimation accuracy of the eyeball center position.

In the eyeball information estimation device according to the aspect of the disclosure, for example, in a case where the pupil reliability of the pupil in the image acquired by the acquisition unit is equal to or lower than a second pupil threshold value lower than the first pupil threshold value, the selection unit may execute neither the first sight line angle calculation processing nor the second sight line angle calculation processing. According to this configuration, for example, in a case where the detection accuracy (pupil reliability) of the center position of the pupil is low, the sight line angle calculation is not executed, and it is possible to avoid using an inaccurate processing result.

In the eyeball information estimation device according to the aspect of the disclosure, for example, the selection unit may select the first sight line angle calculation processing in a case where the Purkinje reliability of the Purkinje image in the image acquired by the acquisition unit is higher than a second Purkinje threshold value lower than the first Purkinje threshold value, and select the second sight line angle calculation processing in a case where the Purkinje reliability is equal to or lower than the second Purkinje threshold value. According to this configuration, for example, it is possible to execute an appropriate sight line angle calculation processing that corresponds to the content of the acquired image.

Although the embodiment and the modification example of the disclosure have been described, the embodiment and the modification example are presented as examples and are not intended to limit the scope of the disclosure. The above-described novel embodiment can be implemented in other various forms, and various omissions, substitutions, and modifications can be made without departing from the scope of the disclosure. The above-described embodiment and the modification thereof are included in the scope and the gist of the disclosure, and are included in the disclosure described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An eyeball information estimation device comprising:
a processor configured to implement:
an acquisition unit configured to acquire an image that includes a pupil of an eye of a subject and a Purkinje image of a light source on a corneal surface of the eye of the subject;
a detection unit configured to detect a center position of the pupil and a position of the Purkinje image;
a selection unit configured to select which of first sight line angle calculation processing of calculating a sight line angle of the eye of the subject based on the center position of the pupil and the position of the Purkinje image, and second sight line angle calculation processing of calculating the sight line angle of the eye of the subject based on the center position of the pupil and an eyeball center position of the eye that is read from a storage unit and corresponds to the subject is to be executed; and a processing unit configured to estimate an eyeball center position of the eye of the subject based on a three-dimensional face model determined based on the sight line angle and update the eyeball center position of the storage unit, at least on a condition that a pupil reliability indicating a likelihood of being the pupil is higher than a predetermined first pupil threshold value, and a Purkinje reliability indicating a likelihood of being the Purkinje image is higher than a predetermined first Purkinje threshold value, in a case where the first sight line angle calculation processing is selected, wherein the selection unit selects the first sight line angle calculation processing in a case where the Purkinje reliability of the Purkinje image in the image acquired by the acquisition unit is higher than a second Purkinje threshold value lower than the first Purkinje threshold value, and selects the second sight line angle calculation processing in a case where the Purkinje reliability is equal to or lower than the second Purkinje threshold value.

2. The eyeball information estimation device according to claim 1, wherein the condition for updating the eyeball center position by the processing unit further includes at least one of conditions in which an eye reliability indicating a likelihood of being the eye of the subject is higher than a predetermined eye threshold value, a reliability of a three-dimensional fitting of feature points of a face of the subject is higher than a predetermined fitting threshold value, a change amount of the sight line angle calculated in the first sight line angle calculation processing with respect to a sight line angle calculated in the previous processing is less than a predetermined angle change threshold value, a position of the face of the subject is within a predetermined region of the image, and a face direction of the subject is a predetermined direction in the image.

3. The eyeball information estimation device according to claim 1, wherein in a case where the pupil reliability of the pupil in the image acquired by the acquisition unit is equal to or lower than a second pupil threshold value lower than the first pupil threshold value, the selection unit executes neither the first sight line angle calculation processing nor the second sight line angle calculation processing.

4. An eyeball information estimation method comprising:

an acquiring step of acquiring an image that includes a pupil of an eye of a subject and a Purkinje image of a light source on a corneal surface of the eye of the subject;

a detecting step of detecting a center position of the pupil and a position of the Purkinje image;

a selecting step of selecting which of first sight line angle calculation processing of calculating a sight line angle of the eye of the subject based on the center position of the pupil and the position of the Purkinje image, and second sight line angle calculation processing of calculating the sight line angle of the eye of the subject based on the center position of the pupil and an eyeball center position of the eye that is read from a storage unit and corresponds to the subject is to be executed; and a processing step of estimating an eyeball center position of the eye of the subject based on a three-dimensional face model determined based on the sight line angle and updating the eyeball center position of the storage unit, at least on a condition that a pupil reliability indicating a likelihood of being the pupil is higher than a predetermined first pupil threshold value, and a Purkinje reliability indicating a likelihood of being the Purkinje image is higher than a predetermined first Purkinje threshold value, in a case where the first sight line angle calculation processing is selected, wherein the selection step is configured to select the first sight line angle calculation processing in a case where the Purkinje reliability of the Purkinje image in the acquired image is higher than a second Purkinje threshold value lower than the first Purkinje threshold value, and selects the second sight line angle calculation processing in a case where the Purkinje reliability is equal to or lower than the second Purkinje threshold value.

5. A non-transitory computer readable medium, storing a program for causing a computer to execute:

an acquiring step of acquiring an image that includes a pupil of an eye of a subject and a Purkinje image of a light source on a corneal surface of the eye of the subject, a detecting step of detecting a center position of the pupil and a position of the Purkinje image, a selecting step of selecting which of first sight line angle calculation processing of calculating a sight line angle of the eye of the subject based on the center position of the pupil and the position of the Purkinje image, and second sight line angle calculation processing of calculating the sight line angle of the eye of the subject based on the center position of the pupil and an eyeball center position of the eye that is read from a storage unit and corresponds to the subject is to be executed; and a processing step of estimating an eyeball center position of the eye of the subject based on a three-dimensional face model determined based on the sight line angle and updating the eyeball center position of the storage unit, at least on a condition that a pupil reliability indicating a likelihood of being the pupil is higher than a predetermined first pupil threshold value, and a Purkinje reliability indicating a likelihood of being the Purkinje image is higher than a predetermined first Purkinje threshold value, in a case where the first sight line angle calculation processing is selected, wherein the selection step is configured to select the first sight line angle calculation processing in a case where the Purkinje reliability of the Purkinje image in the acquired image is higher than a second Purkinje threshold value lower than the first Purkinje threshold value, and selects the second sight line angle calculation processing in a case where the Purkinje reliability is equal to or lower than the second Purkinje threshold value.

6. The eyeball information estimation device according to claim 2, wherein in a case where the pupil reliability of the pupil in the image acquired by the acquisition unit is equal to or lower than a second pupil threshold value lower than the first pupil threshold value, the selection unit executes neither the first sight line angle calculation processing nor the second sight line angle calculation processing.

* * * * *